United States Patent [19]
Gatto et al.

[11] Patent Number: 5,468,943
[45] Date of Patent: Nov. 21, 1995

[54] DEVICE FOR ANALYZING INFORMATION MEDIA WITH AN ELASTICALLY MOUNTED IMAGE SENSOR

[75] Inventors: Jean-Marie Gatto; Dominique Bertrand, both of Paris, France

[73] Assignee: International Des Jeux, France

[21] Appl. No.: 121,503

[22] Filed: Sep. 15, 1993

[30] Foreign Application Priority Data

Sep. 17, 1992 [FR] France ..................... 92 11112
Dec. 31, 1992 [FR] France ..................... 92 16008
Jan. 13, 1993 [FR] France ..................... 93 00215

[51] Int. Cl.⁶ .................................................. G06K 7/10
[52] U.S. Cl. ........................ 235/454; 235/475; 358/496
[58] Field of Search ........................... 235/475, 454; 358/496, 498, 474

[56] References Cited

U.S. PATENT DOCUMENTS

| | | |
|---|---|---|
| 4,036,430 | 7/1977 | Eppich . |
| 4,684,792 | 8/1987 | Nickels . |
| 5,038,027 | 8/1991 | Ioka . |
| 5,070,415 | 12/1991 | Matsumoto ............ 353/482 |
| 5,153,750 | 10/1992 | Hiroi et al. . |
| 5,267,058 | 11/1993 | Sata ..................... 358/498 |
| 5,278,677 | 1/1994 | Lee ...................... 358/498 |

FOREIGN PATENT DOCUMENTS

| | | |
|---|---|---|
| 0261761A3 | 3/1988 | European Pat. Off. . |
| 0440026A1 | 8/1991 | European Pat. Off. . |
| 0465768A2 | 1/1992 | European Pat. Off. . |

OTHER PUBLICATIONS

Patent Abstract of Japan, vol. 12, No. 146 (E-605) May 6, 1988 & JP-A-62 252 563 (NEC Corp.) Nov. 14, 1987.

*Primary Examiner*—Donald Hajec
*Assistant Examiner*—Karl D. Frech
*Attorney, Agent, or Firm*—Sterne, Kessler, Goldstein & Fox

[57] ABSTRACT

An analysis device for reading and processing information media. The device includes a medium feeder, an optical reader, and an information processor for processing, converting, and transmitting the information as digital data. The optical reader comprises an image detector (15) of elongate shape suspended in a casing (1,2,3) and having, at its ends, mounting ribs (20) interacting with complementary inclined mounting furrows (21) provided in the corresponding end walls (2,3) of the casing, elastic members (23) interposed between the image detector (15) and the casing (1,2,3); and an entrainer for moving the information medium past the image detector (15). The entrainer includes a roll (17) and an electric motor (50) for rotating the roll (17). The roll (17) is mounted in the end walls (2,3) of the casing (1,2,3) by latches (37,38), holding the image detector (15) in the casing (1,2,3). The elastic members (23), in turn, apply the image detector (15) against the surface of the roll (17).

25 Claims, 8 Drawing Sheets

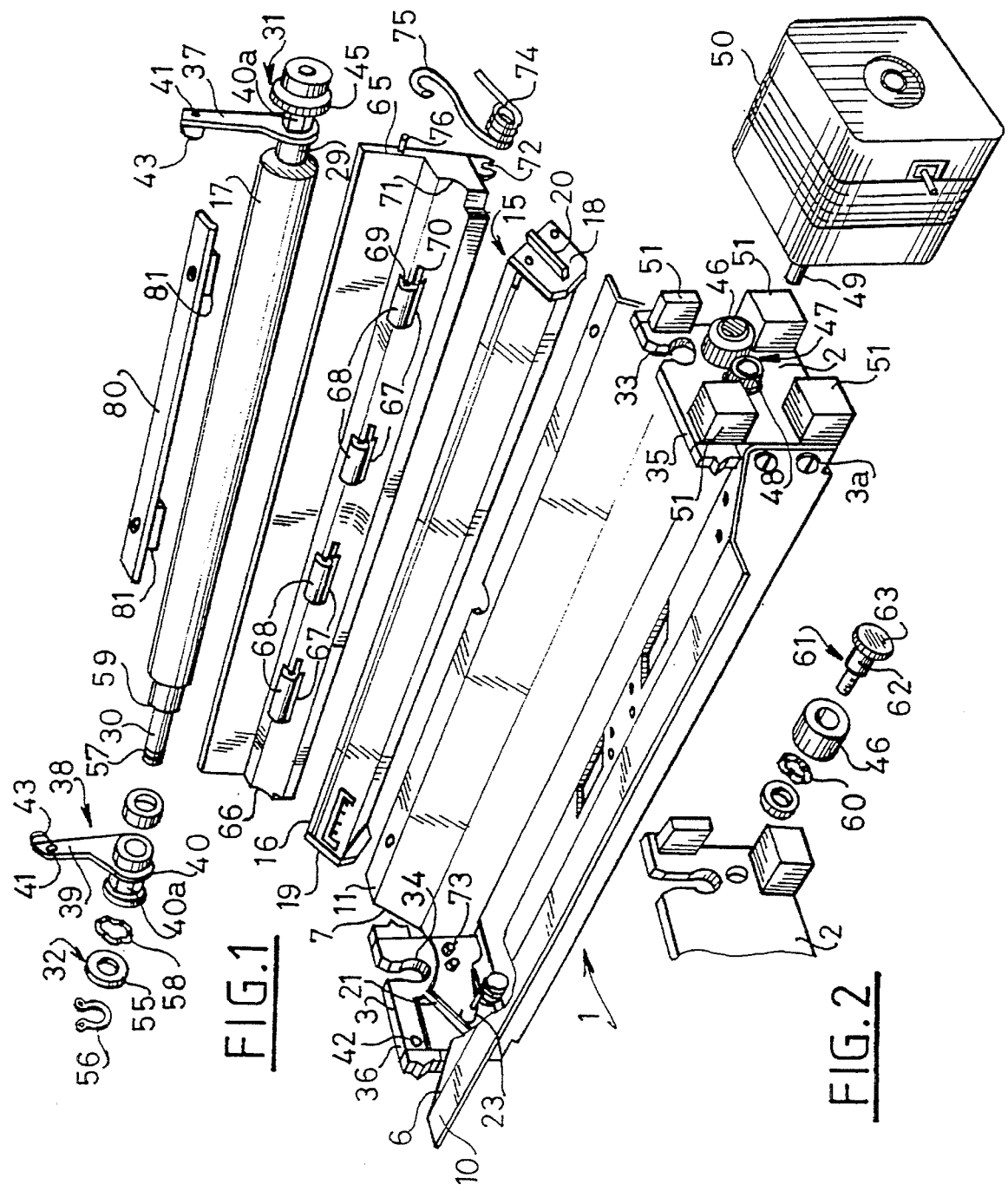

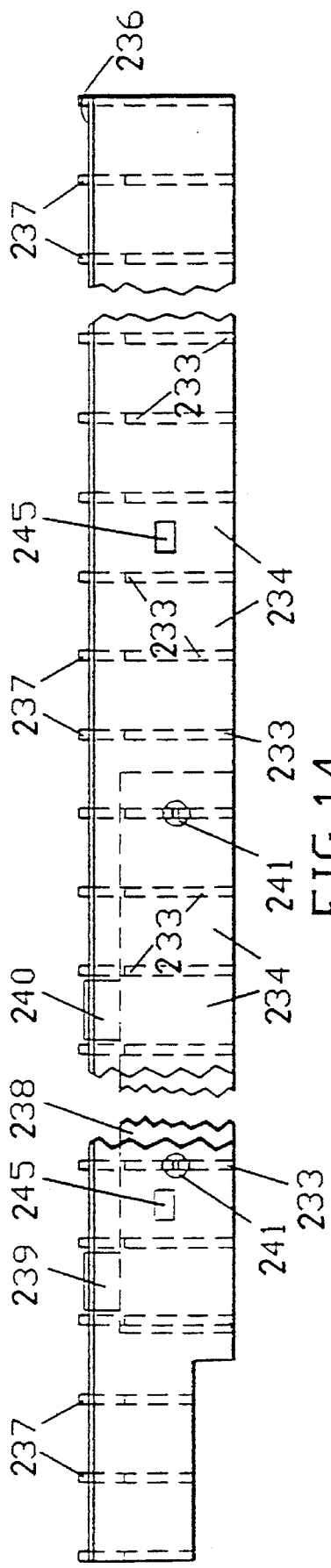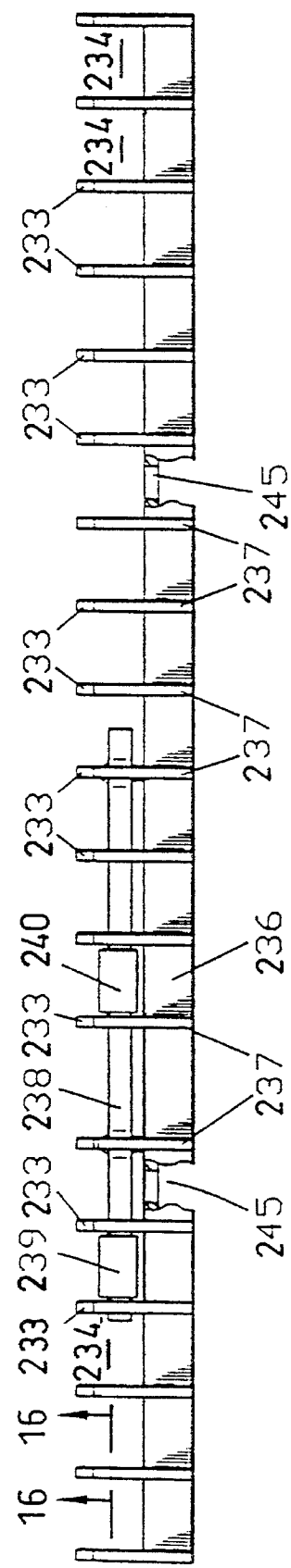

DEVICE FOR ANALYZING INFORMATION MEDIA WITH AN ELASTICALLY MOUNTED IMAGE SENSOR

The present invention relates to devices for analysing documents, and concerns more particularly, although not exclusively, devices for analysing gaming slips or receipts handed out to players by way of justification for the gaming slips which they have submitted, and for the totals of the stakes which they have deposited.

Some games, particularly lottery games, consist in having the player fill in a slip comprising a grid formed of boxes in which the player places signs so as to form a combination on which he bets.

These gaming slips are handed in by the players at gaming shops equipped with terminals and receipts are handed out to them in return for the slips, and in return for payment of a corresponding stake.

The gaming terminals are generally equipped with analysis devices or slip and receipt readers which make it possible to formulate coded signals transmitted to a central unit in which the games of the players are stored in memory until the draw.

The invention aims to improve the document-analysis devices with a view to offering them up and filing them past under the best conditions in order to ensure reliable reading.

Its subject is therefore a device for analysing an information medium, particularly gaming slips or receipts and comprising means for inserting the medium, means for reading the information on the medium, means for processing the information read from the medium with a view to converting it into digital data and to transmitting it, characterized in that the reading means comprise an image detector of elongate shape suspended in a casing and having, at its ends, mounting means interacting with complementary mounting means provided in the corresponding end walls of the casing, elastic members interposed between the image detector and the casing, means for entraining the information media past the image detector, comprising a roll and an electric motor for rotating the roll, the said roll being mounted in the end walls of the casing by means of latches and holding the image detector in the said casing, the elastic members applying the image detector against the surface of the roll either in the presence of an information medium between the image detector and the roll, or when it is empty.

The invention will be better understood with the aid of the description which will follow, given solely by way of example and made with reference to the appended drawings, in which:

FIG. 1 is a blown-up perspective view of the device for analysing information media according to the invention;

FIG. 2 is a blown-up perspective view of one detail of the device of FIG. 1;

FIG. 14 is a side view in the direction of the arrow 14 of FIG. 13, of the protection device of FIG. 13;

FIG. 15 is a view in the direction of the arrow 15 of FIG. 13 of the device of FIG. 14;

FIG. 16 is a section on a larger scale along the line 16—16 of FIG. 15 showing the profile of a fin of the device; and FIG. 16A is a view in section corresponding to the one of FIG. 16 showing a variant of the profile of the fins.

The device for analysing information media or documents, represented in FIG. 1, includes a casing 1 in the form of a channel of overall U-shaped cross-section with flared edges, produced from sheet metal, and closed at its ends by flanges 2 and 3 made of plastic, for example fixed to the casing 1 for example by screws 3a.

Figure 3:
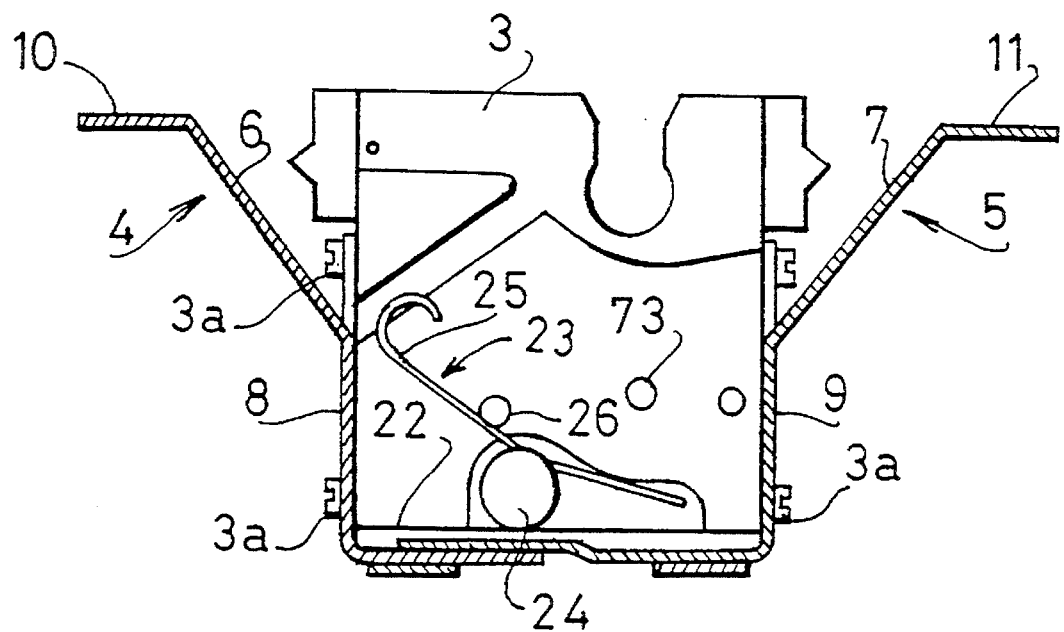
FIG. 3 is a view in transverse section of the casing of the analysis device according to the invention, some components of which have been removed.

The flared edges 4 and 5 of the casing 1 include, as can be seen clearly in FIG. 3, inclined portions 6,7 each one extending a vertical leg 8,9 of the casing, and horizontal rims 10,11.

This flared form of casing 1 makes it easier to mount the device into a larger assembly such as, for example, a gaming terminal or the like.

In the casing thus constituted, is arranged an image detector 15 of elongate parallelepipedal form, extending over the entire length of the casing and consisting of a linear light source (not shown), means for focusing the light emitted by the source onto a transparent wall 16 located facing a roll 17 for entraining documents, and photo-sensitive elements (not shown) for detecting the light beams coming from the linear source when they are reflected by a document placed between the transparent wall 16 and the roll 17.

The image detector 15 includes, at its ends, mounting plates 18,19, which, as seen on the plate 18, each include a projection 20 interacting with an inclined furrow made in each of the end flanges 2,3 of the casing and of which only the furrow 21 of the flange 3 is visible, for allowing the image detector 15 to be mounted in the casing 1.

As is seen clearly in FIG. 3, at the lower part of each end flange 2,3 of the casing, close to the bottom 22, is fixed a hairpin spring 23 mounted on a stud 24 secured to the corresponding flange 3, and including a bent-over branch 25 held in abutment against a peg 26 and intended to come into contact with one edge of the corresponding mounting plate 19 of the image detector 15 in order thus to suspend the detector 15 in the casing 1 or give it a floating mounting therein.

The image detector 15 is held in place in the casing by the entrainment roll 17, the periphery of which is coated, as known per se, with a layer of cellular rubber 28 or the like.

At each of its ends, the roll 17 includes spindles 29,30 provided with corresponding bearings 31,32 intended to be received in respective notches 33,34 made in the upper edges 35,36 of the end flanges 2 and 3 of the casing 1.

The bearings 31,32 are each provided with a latch 37,38 for immobilizing the roll 17 with respect to the casing 1.

These latches are identical, so that only the one which is more visible in the drawing, namely the latch 38, will be described.

It includes a rod 39 secured to a hub 40 forming one of the components of the corresponding bearing and provided with flats 40a for engaging the bearings in the corresponding notches 33,34 of the flanges 2,3 when the latches are in the unlatched position.

At the end of the rod 39 which is opposite the hub is provided a hole 41 which interacts with a locking stud 42 provided on the corresponding end flange of the casing 1.

After installing the ends of the roll 17 in the corresponding notches 33,34 of the casing 1, the device is latched by rotating the latches 37,38 and engaging the locking studs such as the stud 42 in the corresponding holes such as the hole 41 of the latches.

The elasticity of the latches 37,38 allows them to deform slightly towards the inside of the casing to allow their engagements over the locking studs 42.

A tongue 43 provided at the end of each latch facilitates the unlocking manoeuvre for the purpose of disengaging the roll 17.

Figure 4:
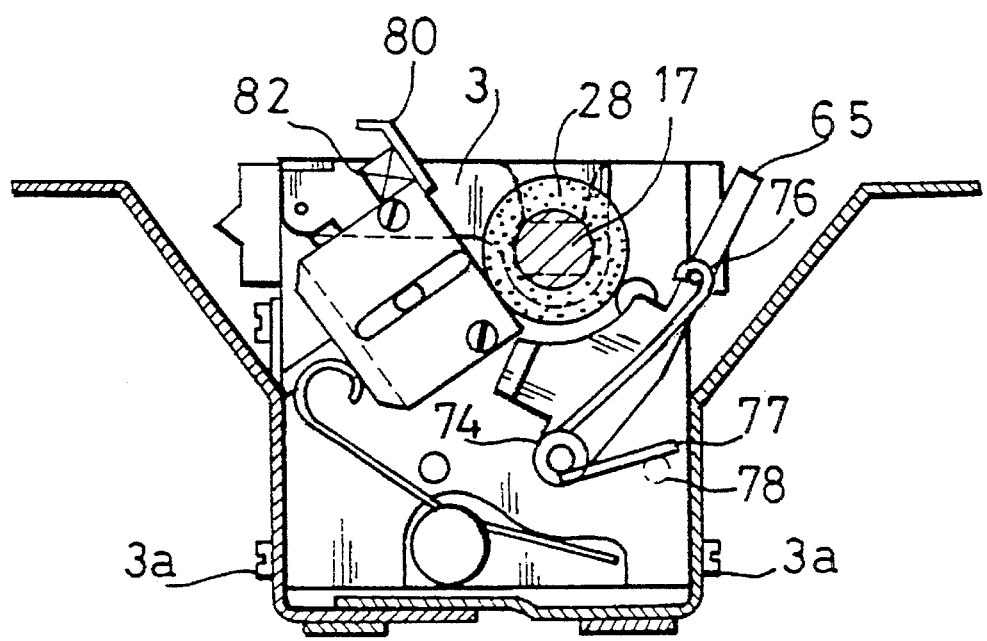
FIG. 4 is a view in transverse section of the assembled device.

As represented in FIG. 4, when the roll 17 is in place in the casing 1, it bears against the transparent face 16 of the image detector 15 and gives rise to the tensioning of the suspension springs of the image detector which thus permanently apply the detector 15 against the roll 17 by virtue of the sliding mounting of the detector 15 in the inclined guide furrows 21 of the casing.

Thus, a permanent contact between the detector and the roll is obtained, whether this be in the presence of a document to be analysed interposed between these two elements, or when empty.

The end spindle 29 of the roll 17 carries a pinion 45 for rotationally entraining the roll and which meshes with the output pinion 46 of a reduction gear 47 having two pinions 46 and 48 rotationally mounted on spindles fixed to the flanges 2 of the casing 1. The input pinion 48 of the reduction gear is wedged onto the output shaft 49 of an electric stepper motor 50 for entraining the roll, and which is fixed to the flanges 2 by means of integrally formed spaces 51 which between them leave sufficient space to house the pinions of the reduction gear 47.

The bearing 32 mounted at the end of the roll 17 opposite the entrainment pinion 45, includes, interposed between the component 40 forming a hub for the latch 38 and a washer 55 bearing on a circlip 56 engaged in an end furrow 57 of the spindle 30 of the roll 17, a crinkle washer 58 the elasticity of which ensures that the bearing 32 is mounted tightly against a corresponding shoulder 59 of the spindle 30 of the roll, the bearing 32 thus forming a brake intended to damp out the vibrations due to the stepwise entrainment of the roll 17, the vibrations being transmitted to the roll 17 by the pinion 45 for entraining it.

In a similar way, as represented in FIG. 2, the output pinion 46 of the reduction gear 47 is also mounted on its spindle by means of a crinkle washer 60, the spindle of the pinion 46 consisting of a threaded rod 61 including a smooth part 62 for receiving the pinion 46 and a head 63 for axially retaining this pinion.

When the threaded rod 61 is screwed into a corresponding tapped hole made in the flange 2 of the casing 1, the crinkle washer 60 is compressed and rotationally brakes the pinion 46 and thus damps out the vibrations which are transmitted to it by the stepper motor 50.

In the casing, there is further arranged a swinging flap 65 for receiving the documents after they have been read by the device. The swinging flap 65 has a profile which is more or less in the form of an angle bracket and itself also extends over the entire length of the casing between its flanges 2 and 3. It includes a longitudinal excess thickness 66 in which are made housings 67 for receiving rollers 68 mounted so that they can rotate on spindles 69 engaged removably by clipping into slits 70 provided on either side of the housings 67. The rollers 68 are four in number and are evenly distributed along the length of the swinging flap 65.

The longitudinal excess thickness 66 of the swinging flap 65 has a concave face 71 in the form of a portion of a cylinder which is coaxial with the roll 17 in order to promote the passage of the documents.

The flap 65 is mounted so that it can swing on the end flanges 2 and 3 of the casing 1, by means of forks 72 which each interact with the spindle 73 which can be seen on the flange 3, pointing towards the inside of the casing 1. The flap 65 is held in position by hairpin springs 74, one branch 75 of which is bent over and fastened onto a stud 76 provided on the end edge of the flap and the opposite end 77 of which is straight and comes into abutment with a peg such as 78 arranged beside the spindle 73 on the flange 3 of the casing 1.

Thus, the springs 74 permanently apply the rollers 68 against the roll 17.

The rollers 68 have the role, on the one hand, of accompanying the documents entrained by the roll 17, as far as the rear edge of the document and, on the other hand, when a document is released by the roll 17, of returning it against the flap in interaction with a stop piece which will be described with reference to FIG. 5.

Of course the corresponding elements are provided on the flange 2 to make sure the flap 65 is mounted so that it can swing at both its ends.

As can be seen in FIG. 4, the device is supplemented by a guide 80 fixed by spacers 81 (FIG. 1) into the casing 1, and which is intended to facilitate the insertion of the documents between the roll 17 and the image detector 15.

Sensors 82, for example infrared sensors, are furthermore arranged along the guide 80 so as to detect the presence of a document at the inlet to the device.

Advantageously, these sensors are two in number and their distance is designed so as to allow the nature of the document offered up to the device to be determined on the basis of the width of this document.

Such a configuration is described in French Patent Application No. 92 10 642 filed on Sep. 7, 1992 by the Applicant Company and entitled "Device for analysing information media, particularly gaming slips".

Instead of being mounted so that it can swing, the flap for guiding and receiving the information media may be mounted so that it is fixed into the casing of the device and the rollers which it carries may be applied against the roll 17 by elastic members.

Figure 5:
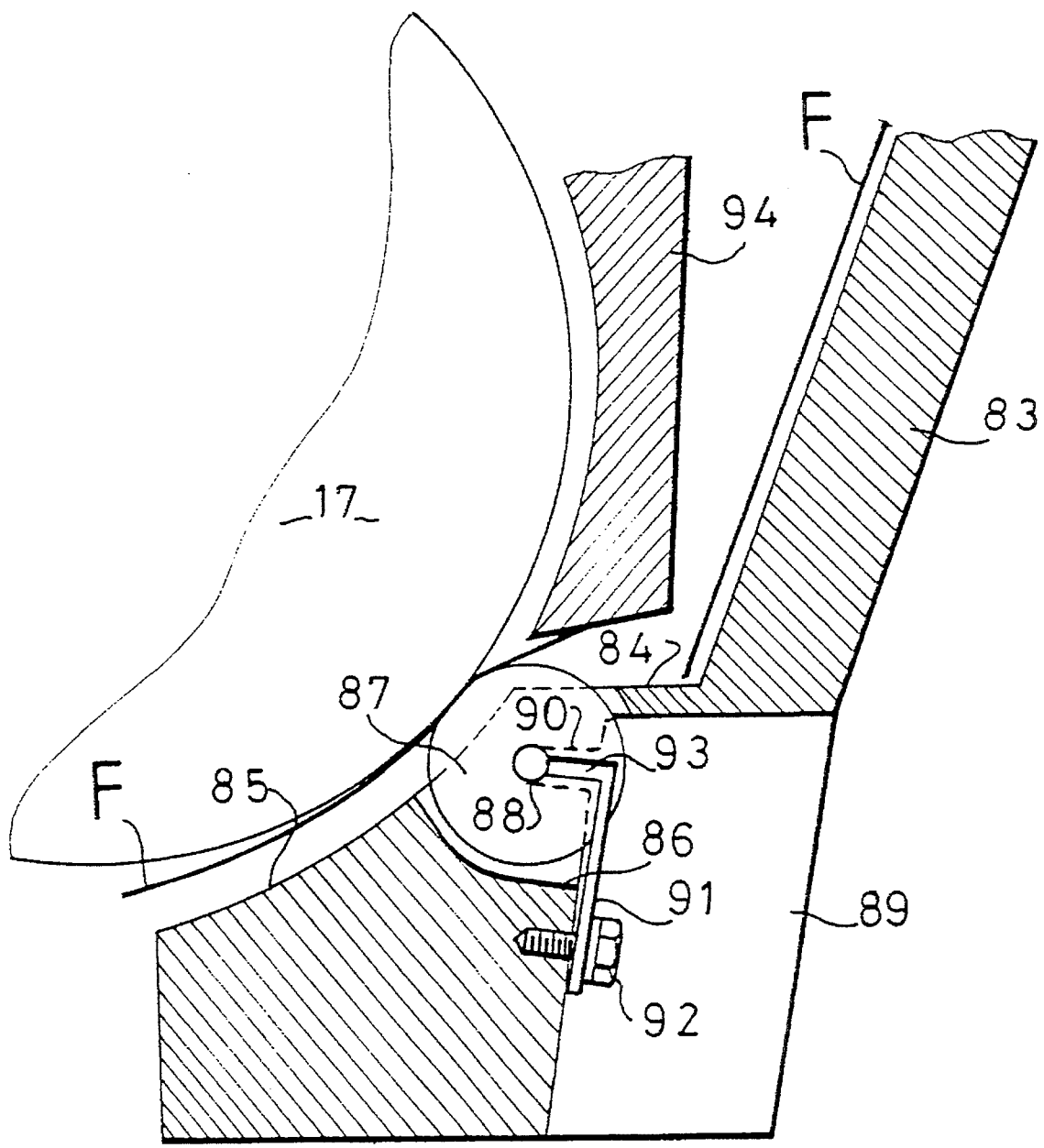
FIG. 5 is a sectional view on a larger scale of one variant of the flap for guiding and receiving documents.

Such a variant is represented in FIG. 5.

According to this variant, the guide flap 83, fixed into the casing (not shown) of the device, includes, like the swinging flap 65 of FIG. 1, an excess thickness 84 having a concave face 85 in the form of a portion of a cylinder and, in this excess thickness, housings 86 for rollers 87 whose role is the same as that of the rollers 68.

The rollers 87 are each mounted on a spindle 88.

In that face of the flap 83 which is opposite the excess thickness 84 are made recesses 89 provided at the locations of the rollers 87 and opening out into the corresponding housings 86.

A spindle 88 of a roller 87 is engaged in grooves 90 hollowed out of the end wall of each recess 89 on either side of the housing 86 and is pressed to the bottom of the said grooves by a leaf spring 91 fixed into the bottom of the recess by a screw 92 and having one branch 93 bent at right angles and having the form of a fork, in contact with the ends of the roller 86 which project with respect to it.

Thus, each roller 86 is forced by its spring 91 into an "out" position with respect to the curved face 85, and consequently forced against the roll 17.

Finally, in FIG. 5, a stop piece 94 is represented which may also be provided in the embodiment of FIG. 1, and which serves, in interaction with the rollers 87, to allow the sheets F of processed documents to be stacked as they leave the device.

To this end, the stop piece 94 includes an inclined edge against which the front edges of the sheets F abut so as then to be pushed against the stack of sheets F already formed against the flap.

The device for analysing documents which has just been described also includes means for processing the information read by the image detector and means for commanding the electric stepper motor 50 to allow the document to be explored by successive line by line scanning.

These means, which do not actually form part of the present invention, are also described in the aforementioned patent application.

In the present embodiment, since the device according to the invention is essentially applied to analysing gaming slips and receipts, the image detector 15 consists of an optical reader which is blind to at least one colour in which the fixed information is printed on the document to be examined and sensitive to other colours so as to take into account only the variable gaming information and the fixed information for framing the document and for denoting the type of game to which it belongs, which are printed in these other colours.

This image detector is also described in French Patent Application No. 92 10642 mentioned above.

It will, however, be understood that the device for analysing information media according to the invention may include an image detector of different construction provided, nevertheless, that it is of a linear type allowing an exploration of the documents which are submitted to it, by filing past.

For example, it is possible to envisage substituting, for the image detector described above, an analyser with overall reading, for analysing a document box by box and for positively recognizing the signs carried by the document, such as those used for example in facsimile machines.

With reference to FIGS. 6 to 11 there will now be described a device for analysing information media in which the image detector is provided with an anti-soiling device.

Figure 6:
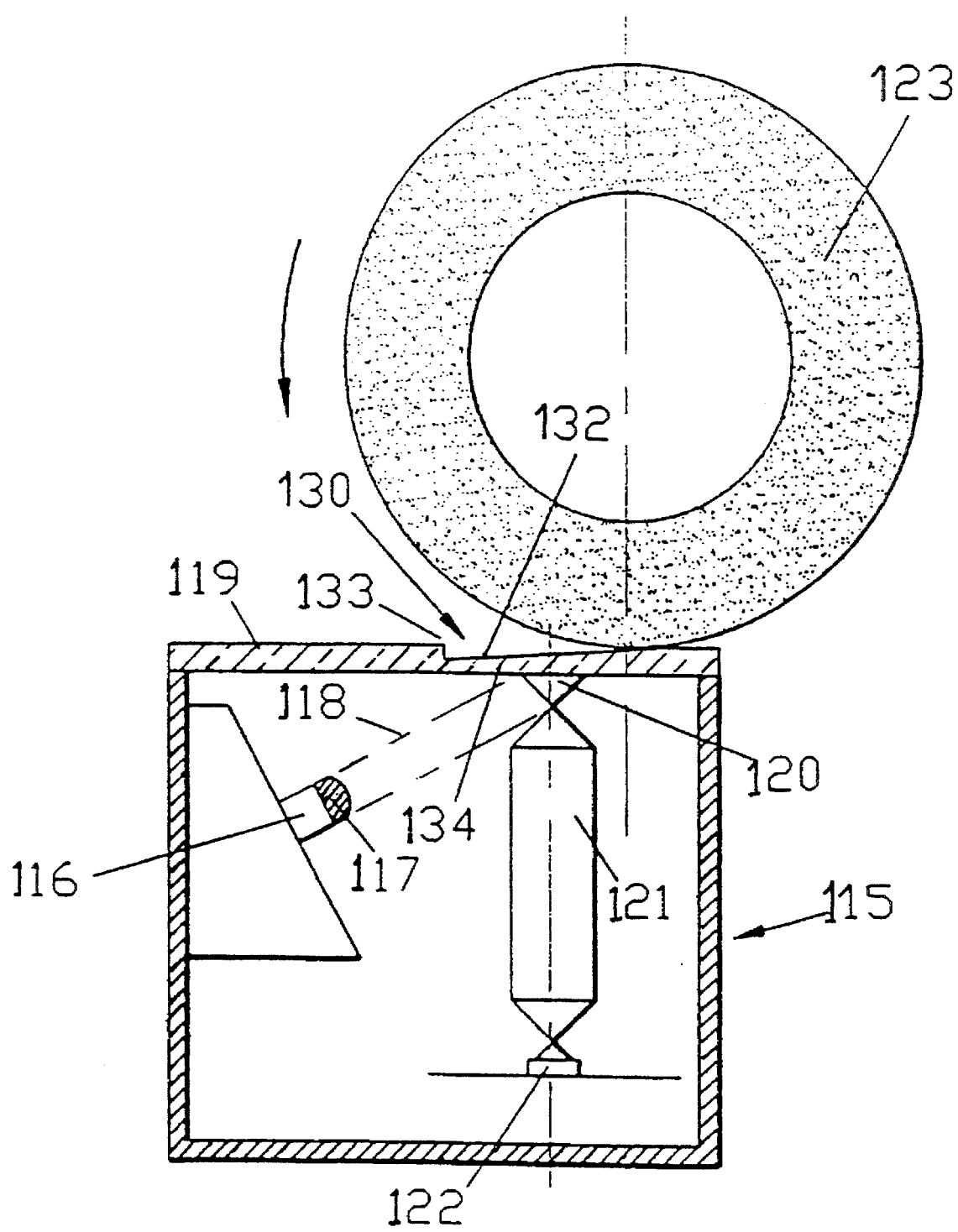
FIG. 6 is a partial view, in section, and on a larger scale, of the image detector device and of the roll for entraining documents which both form part of the device of FIG. 1.

According to this embodiment, the image detector, denoted by the overall reference 115, consists, represented in more detail in FIG. 6, of a light source comprising light-emitting diodes 116 with which are associated members 117 for focusing and filtering the light which are intended to focus the beams 118 onto a transparent wall 119 or screen of the casing of the detector against which the face of a document to be analysed (not shown) is to be applied.

Facing the zone 120 for focusing the beams emitted by the light-emitting diodes 116, are arranged light conductors 121 for transmitting the beams towards photosensitive elements 122.

The transparent wall 119 of the image detector 115 and a roll 123 for entraining the documents corresponding to the roll 17 of FIG. 1 are in contact with one another in a zone which is slightly offset with respect to the optical axes of the light conductors 121.

The transparent wall 119 and the external surface of the roll 123 thus define a wedge-shaped space 130 which makes it easier to insert the documents, but which has the drawback of accumulating dust which may fall from outside the device, for example accompanying the documents inserted into this device.

Moreover, the processed documents often come to receive ink or some other product which risks spreading out over the transparent wall by this wall rubbing against the document.

The accumulation of dust, ink and the like in the space 130 entrains the formation of a deposit in the zone 120 for focusing the light emitted by the sources 116, thus deteriorating the properties of transmitting images illuminated by the sources on the documents analysed towards the photosensitive elements 122 which are intended to convert these images into signals capable of then being processed by digital means (not shown).

In order to overcome this drawback, the transparent wall or screen 119 of the image detector 115 has, in the region of the focusing zone 120, a cutout 132, in the form of a step made in the thickness of the substance of the said transparent wall.

The cutout 132 forms, along the entrainment roll 123, an axial furrow which has one wall 133 of steep slope and one wall of gentle slope 134 more or less in the middle of which the focusing zone 120 is located.

It can therefore be seen that by virtue of this configuration, the external wall of the roll 123 is moved slightly away from the surface of the transparent wall 119 in the region of the focusing zone 120.

Thus, the dust has a lesser tendency to accumulate in this zone and the transmission of the light coming from the source 116 towards the photosensitive elements 122 is thereby enhanced.

Figure 7:
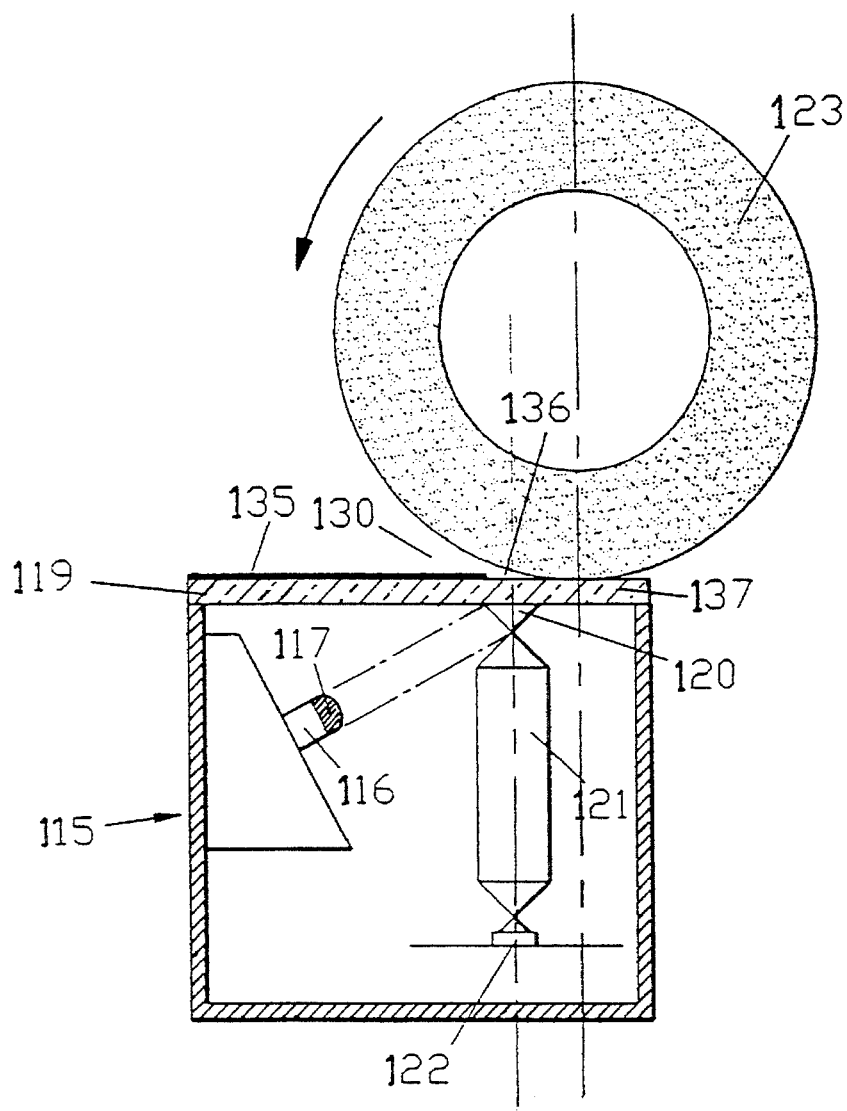
FIG. 7 is a view in section on a larger scale similar to the one of FIG. 6 showing a variant of the anti-soiling device according to the invention.
Figure 8:
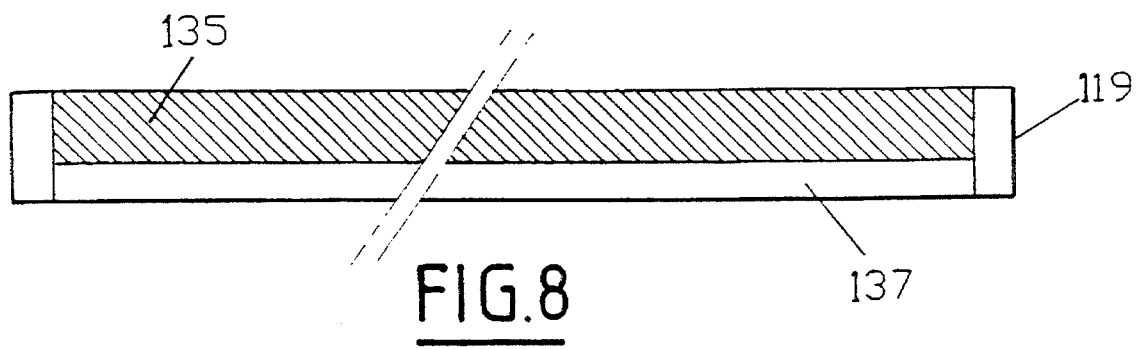
FIG. 8 is a plan view of the anti-soiling device equipping the image detector of FIG. 7.

FIGS. 7 and 8 represent another embodiment of the invention in which the transparent wall 119 of the image detector 115 is covered by a cover 135 of opaque material which also forms, in the region of the focusing zone 120, a step 136 with the part 137 of the uncovered surface of the transparent wall 119.

The effect of the step 136 obtained by covering a part of the transparent wall 119 using the opaque cover 135 is the same as that obtained by hollowing out the furrow 132 of the embodiment described with reference to FIG. 6.

In particular, from FIG. 8, it can be seen that the screen 135 extends over practically the entire length of the transparent wall 119 of the detector device 115.

The embodiment represented in FIGS. 7 and 8, in which an opaque cover 135 is bonded onto the surface of the transparent wall 119 furthermore has the advantage of preventing parasitic light from reaching the photosensitive elements 122. This makes it possible to obtain more accurate signals coming from the documents to be analysed.

The cover 135 is fixed onto the transparent wall by bonding.

Figure 9:
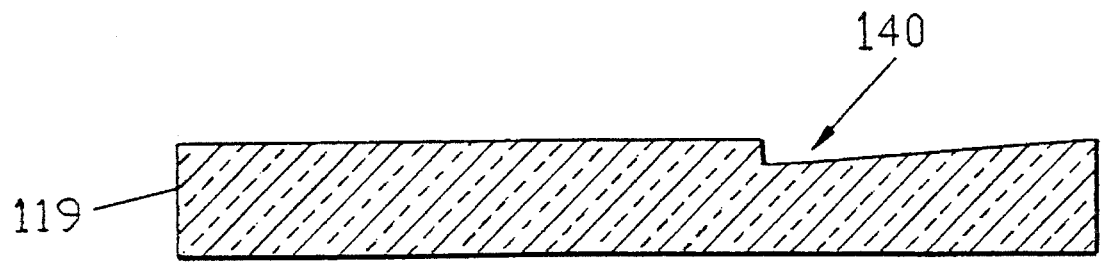
FIG. 9 is a view in transverse section on a larger scale of another embodiment of the anti-soiling device according to the invention.

FIG. 9 is a view in section on a larger scale of another embodiment of the transparent wall 119 of the image detector device 115 of FIG. 6, in which a longitudinal furrow in the form of a step 140 similar to the furrow 132 of the device of FIG. 6 is made along one of the longitudinal edges of the wall 119.

Figure 10:
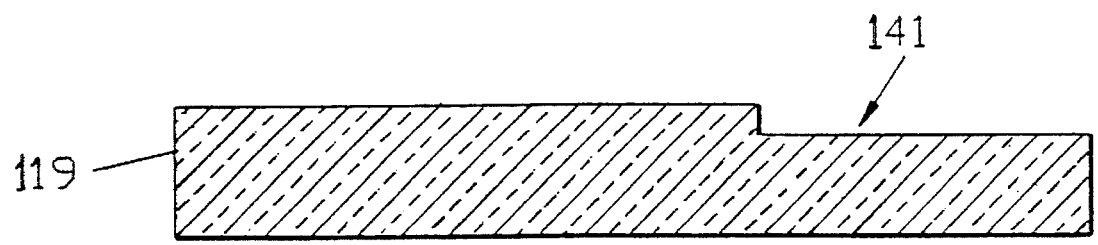
FIG. 10 is a view in section on a larger scale of an image detector device screen which has another type of anti-soiling device according to the invention.

FIG. 10 shows a transparent wall similar to the one of FIG. 9, along one of the longitudinal edges of which is made a step 141 with walls which are respectively parallel to the sides and to the faces of the plate 119 constituting the transparent wall.

Figure 11:
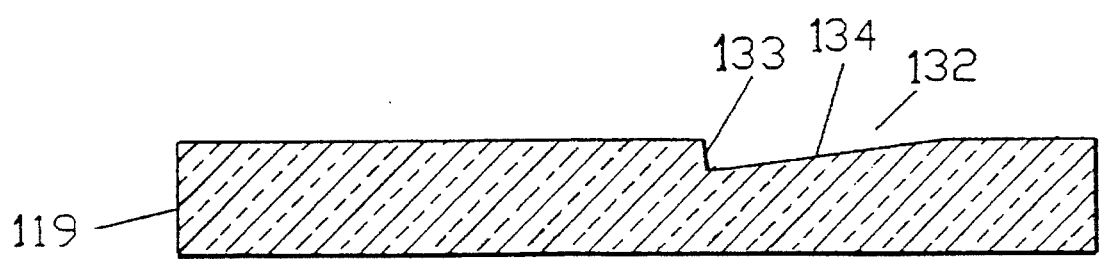
FIG. 11 is a view in section on a larger scale of the device for preventing soiling of the screen of the image detector of the analysis device of FIG. 1.

FIG. 11 is a view on a larger scale of the transparent wall of the image detector device represented in FIG. 6, in which the stepped furrow 132 is made in an intermediate zone of the surface of the transparent wall 119 in contact with the entrainment roll 123, the edge of gentle slope 134 of this step extending on either side of the focusing zone 120 (FIG. 6).

The description which will follow, made with reference to FIGS. 12 to 16A, relates to a device for protection against dust and external particles which device may equip the image detector of the analysis device according to the invention.

Figure 12:
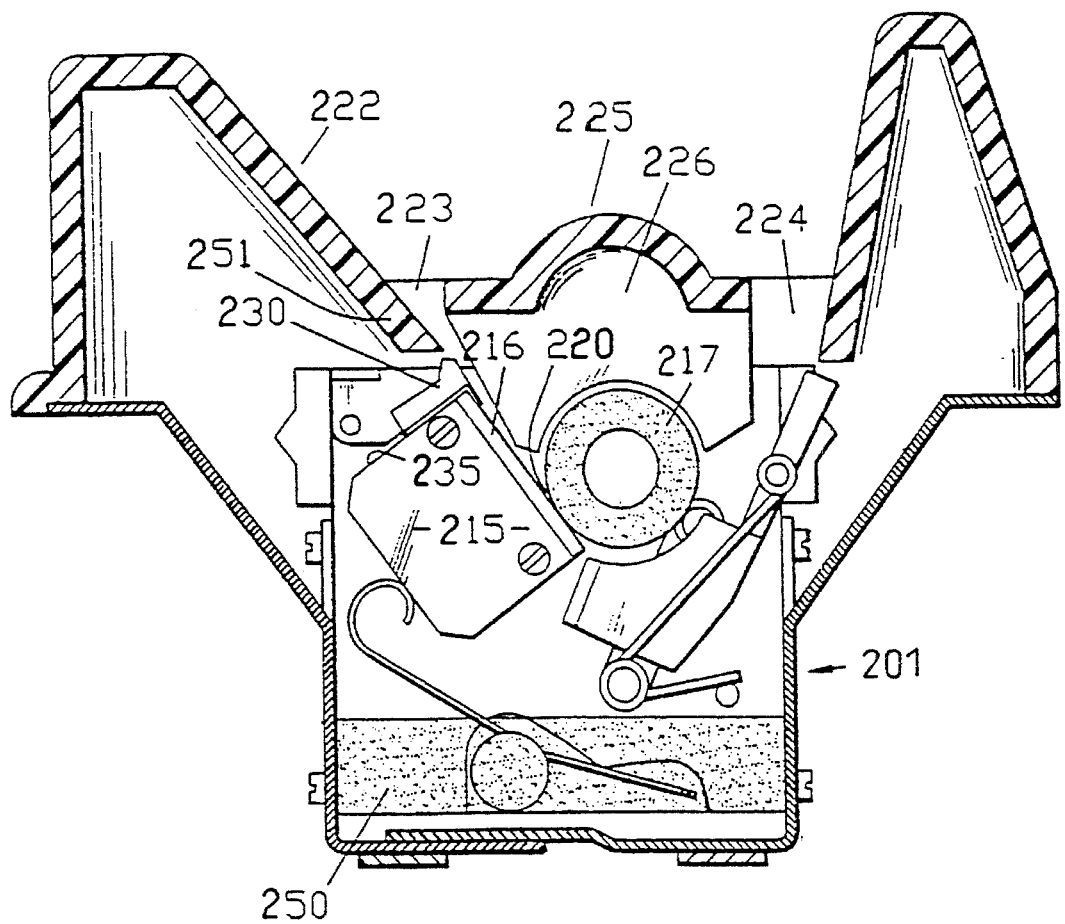
FIG. 12 is a partial view in transverse section of a device for analysing information media forming part of a gaming terminal and which includes an image detector equipped with a dust-protection device according to the invention.

With reference to FIG. 12, it can be seen that the invention is applied to an image detector device which forms part of a device for analysing information media forming a component part of a gaming terminal such as the one described in French Patent Application No. 92 11 275 filed on Sep. 22, 1992 by the Applicant Company.

This image detector includes a series of light sources, means for focusing the light emitted by the sources onto a transparent wall 216 of the casing of the detector, and photosensitive elements for receiving the signals emitted by the light sources.

The transparent wall 216 of the detector 215 is in contact with a roll 217 for entraining documents.

The image detector 215 is arranged in the casing 201 in an inclined fashion.

The transparent wall 216 of the image detector 215 and the roll 217 for entraining the documents are in contact with one another and thus define a wedge-shaped space 220 which makes it easier to insert documents, but which was the drawback of accumulating dust which may fall from outside the device, for example accompanying the documents inserted into it.

The accumulation of dust in the space 220, entrains a deposit of this dust in the zone for focusing the light emitted by the sources of the image detector, thus deteriorating the properties of transmitting images illuminated by the sources on the documents analysed towards the sensitive elements of the detector which are intended to convert the images into signals capable of then being processed by digital means (not shown).

In the embodiment represented in FIG. 12, the analysis device is protected at its upper part by a cover 222 which has slits 223 and 224 for the inlet and outlet of the processed documents as well as a central zone 225 from which there extend evenly spaced fins 226. The fins 226 have a profile which matches the shape of the entrainment roll 217 making it possible to prevent a document conveyed by the roll 217 from tending to turn back towards the inlet to the device.

Figure 13:
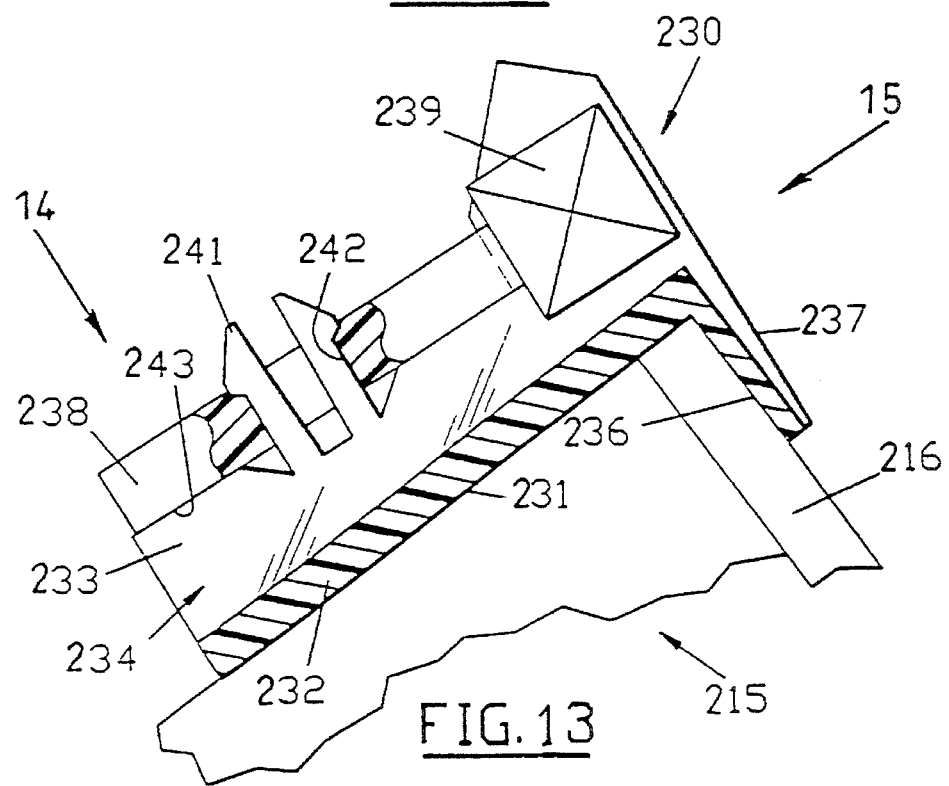
FIG. 13 is a view on a larger scale, in transverse section, of the protection device according to the invention.

On the image detector 215 is mounted, in the extension of the inlet slit 223 of the cover 222, a device 230 for protecting against dust, which is represented in more detail in FIGS. 13 to 15.

In FIG. 13, it can be seen that the device 230 for protection against dust comprises a section 231 in the shape of an elongate angle bracket, a first leg 232 of which carries a series of transverse fins 233 which define passages 234 intended to promote the falling of particles of dust which penetrate into the document reading device via the inlet 223. The particles of dust fall into the passages 234 by gravity along one wall 235 of the image detector which is perpendicular to its transparent wall 216.

The section 232 includes another leg 236 applied onto the edge of the transparent wall 216 of the image detector 215 and on which there are provided ribs 237 whose height decreases between the inlet 223 to the device and the surface of the transparent wall 216 of the image detector, these ribs, each of which extends a transverse fin 233 extending parallel to the direction of travel of the documents thus guiding the documents towards the space 220 formed between the transparent wall 216 and the entrainment roll 217.

The device for protection against dust also serves as a support for a printed circuit 238 for detecting the presence of a document and which carries photodiodes 239, 240 arranged at a given distance from one another so as to detect the presence of a document offered up to the inlet to the device.

The printed circuit 238 is fixed on the device 230 for protection against dust by split elastic fingers 241 formed integrally with transverse fins 233 secured to the leg 231 of the section 230. The split fingers 241 interact by engagement with holes 242 made in the printed circuit 238.

In order to receive the printed circuit 238, the fins 233 include cutouts 243 which together constitute a housing for the printed circuit.

The photodiodes 239 and 240 are mounted on the edge of the printed circuit 238 and are each arranged between two neighbouring fins 233 as emerges clearly from FIG. 15.

The housing for the printed circuit 238 defined by the cutouts 243 of the transverse fins 233, forms, together with the leg 231 of the section 230, an accurate angle making it possible to position the diodes 239 correctly with respect to the direction of penetration of the documents into the analysis device.

The device for protection against dust is fixed to the casing of the image detector 215, or more precisely to the wall 235 of the latter for example by means of clips (not shown) and which are engaged in orifices 245 located facing corresponding orifices provided in the wall 235 of the casing of the image detector (not shown).

As can be seen in particular in FIG. 16, the upper edges of the transverse fins 233 and of the ribs 237 which extend them have a curved convex profile 246 intended to make it easier for particles of dust to fall on each side of each of the fins 233 into the passages 234.

According to the variant represented in FIG. 16A, the convex profile 247 of the fins 233 is a profile with two slopes also making it possible to make it easier for the particles to fall into each passage 234 defined between two neighbouring fins 233.

Referring again to FIG. 12, it can be seen that the bottom of the casing 201 of the device for analysing documents is occupied by a body 250 made from a foam for absorbing dust and liquids which fall along the path defined by the passages 234 of the protection device 230 after having passed around the casing of the image detector 215.

FIG. 12 also shows that the walls of the cover 222 which define the slit 223 include an extension 251 which extends to the immediate vicinity of the protection device 230, so that the particles of dust penetrating the inlet 223 are conveyed directly into the passages 234 made between the transverse fins 233 of the protection device 230.

By virtue of such a configuration, the particles of dust, to all practical purposes, do not reach the transparent wall 216 of the image detector 215, so that the space 220 between this transparent wall and the entrainment roll 217 remains free of dust, the transmission of the data illuminated on the processed documents by the light sources of the image detector thereby being considerably enhanced.

I claim:

1. A device for analyzing an information medium, particularly gaming slips or receipts, the analysis device comprising:

means for inserting the medium;

means for reading the information on the medium; and means for processing the information read from the medium with a view to converting it into digital data and to transmitting it, the reading means comprising, an image detector (15;115;215) of elongate shape suspended in a casing (1,2,3;201) and having, at its ends, mounting means (20) interacting with complementary mounting means (21) provided in the corresponding end walls (2,3) of the casing, elastic members (23) interposed between the image detector (15) and the casing (22), and means for entraining the information media past the image detector, comprising a roll (17) and an electric motor (50) for rotating the roll, the roll (17;123;217) being mounted in the end walls (2,3) of the casing by means of latches (37,38) and holding the image detector (15;115;215) in the casing, the elastic members (23) applying the image detector (15;115;215) against the surface of the roll either in the presence of an information medium between the image detector (15;115;215) and the roll (17;123;217), or when it is empty, wherein the casing of the device in cross-section has the shape of a flared U which is closed at its ends by flanges (2,3) made of plastic and in that the image detector (15) includes, at its ends, mounting plates (18,19) provided with ribs (20) interacting with inclined furrows (21) made in the end flanges (2,3) of the casing (1), the mounting plates (18,19) and the inclined furrows (21) constituting the complementary means for mounting the image detector (15) in the casing.

2. Analysis device according to claim 1, characterized in that the roll (17) for entraining the information media includes, at its ends, spindles (29,30) provided with bearings (31,32) of which the latches (37,38) form a part, and the end flanges (2,3) of the casing (1) comprise notches (33,34) for receiving the bearings (31,32) of the roll, and means (42) for locking the latches (37,38) in the latched position.

3. Analysis device according to claim 1, characterized in that the said elastic means for applying the image detector (15) against the roll (17) are hairpin springs (23) mounted on studs (24) provided on the end flanges (2,3) of the casing and each one having a bent-over branch (25) held in abutment against a peg (26) secured to a corresponding flange and intended to come into contact with one edge of the corresponding mounting plate (18,19) of the image detector (15) in order thus to suspend the detector (15) in the casing (1).

4. Analysis device according to claim 1, characterized in that at least one of the bearings (32) of the roll (17) for entraining the information media includes means (58) forming a brake intended to damp out the vibrations to which the roll (17) is subjected by the entrainment means (45,47,50).

5. Analysis device according to claim 1, characterized in that each latch (37,38) of the roll (17) includes a rod secured to a hub (40) forming an integral part of the corresponding bearing (31,32), the said rod (37,38) having, at its free end, locking means (41) which are complementary to the locking means (42) provided on the end flanges (2,3) of the casing, whereas the hub (40) includes flats (40a) for inserting the hub into the corresponding notch (33,34) of the said flange, in the unlatched position of the latch, the rods of the latches exhibiting an elasticity allowing engagement and release of the complementary locking means (41,42).

6. Analysis device according to claim 1, characterized in that there is furthermore provided a flap (65;83) mounted in the casing (1,2,3) and intended to guide and to receive the information media during and after their passage between the roll (17) and the image detector (15), the flap including a longitudinal excess thickness (66) exhibiting a concave face (71) in the form of a portion of a cylinder which is coaxial with the roll (17) and provided with housings (67,86) for receiving rotary rollers which are evenly distributed along its length.

7. Analysis device according to claim 6, characterized in that the flap (65) can swing and in that the rotary rollers (68) are mounted in their housings (67) by means of spindles (69) engaged removably, by clipping into slits (70) provided on either side of the housings (67).

8. Analysis device according to claim 6, characterized in that the flap (65) is mounted so that it can swing in the casing (1,2,3) by means of forks (72) interacting with spindles (73) provided on the end flanges (2,3) of the casing, with interposition of return springs (74) applying the rollers (68) against the roll (17) for entraining the information media.

9. Analysis device according to claim 6, characterized in that the flap (83) for guiding and receiving the information media is mounted so that it is fixed in the casing of the device and in that the rotary rollers (87) are mounted in their housings (86) and interact with elastic members (91) for applying the said rollers (87) against the roll (17) for entraining the information media.

10. Analysis device according to claim 6, characterized in that stop means (94) are arranged above the rollers (68;87) in order to deflect the sheets (F) of documents leaving the device and thus to stack them against the flap (65;83).

11. Analysis device according to claim 10, characterized in that it includes a device for protection against dust and external particles for the transparent wall (216) of the image detector (215), comprising a member (230) for guiding the documents which can be fitted to the casing of the image detector (215), the said guide member comprising a series of passages (234) arranged transversely to the direction of travel of the documents along the casing of the image detector (215) so as to allow particles of dust to fall, by gravity, along the casing of the image detector (215) before they reach its transparent wall (216).

12. Analysis device according to claim 11, characterized in that a pad (250) for absorbing dust and liquid is arranged below the transverse passages (234) so as to gather dust and liquid falling through the said passages.

13. Analysis device according to claim 11, characterized in that the protection device comprises a section in the shape of an angle bracket (231), one longitudinal leg (232) of which, intended to be applied against one wall (235) of the image detector (215)-close to its transparent wall (216), is provided with transverse fins (233) which define the said passages (34).

14. Analysis device according to claim 13, characterized in that the other leg (236) of the section (231), intended to be applied against the transparent wall (216) of the image detector (215), includes inclined transverse ribs (237) extending parallel to the direction of travel of the documents so as to guide them, and each one extending a transverse fin (233).

15. Analysis device according to claim 14, characterized in that the edges of the ribs (237) for guiding the documents, which are intended to come into contact with the documents, have a profile (246;247) which is convex, rounded, or has two slopes, making it easier for particles of dust to fall into the said transverse passages (234).

16. Protection device according to claim 13, characterized in that the transverse fins (233) which define the said passages (234) include cutouts (243) so as to constitute a housing for a printed circuit (238) carrying members (239, 240) for detecting the presence of documents, at least two transverse fins being provided with means (242) for fixing the printed circuit onto the device.

17. Analysis device according to claim 16, characterized in that the means for fixing the printed circuit (238) comprise members with elastic engagement (242) formed integrally with the edge of the corresponding transverse fins (233).

18. Analysis device according to claim 1, characterized in that the motor (50) for rotating the entrainment roll (17) is a stepper motor and is mounted on one of the end flanges (2) of the casing (1,2,3), its output shaft (49) being connected to a pinion (45) secured to the entrainment roll (17) by means of a reduction gear (47) the output pinion (46) of which includes means (60) forming a brake for damping out the vibrations coming from the electric motor (50).

19. Analysis device according to claim 2, in which the image detector (115) includes a transparent screen (119) for transmitting light from a light source (117) between an information medium illuminated by the source and a reading element (122) receiving the images of the information carried by the medium, the screen being in contact, in the light-transmission zone, with a member (123) for applying the information medium against the said screen, the zone of contact between the application member and the screen forming a zone for accumulating dust and spreading out ink or any other product likely to form an obstacle to the transmission of light towards the reading element (122), characterized in that there is made, on the surface of the screen (119), a step (132;136;140;141) forming an anti-soiling device containing the light-transmission zone and located in front of the zone of contact between the screen and the application member in the direction of travel of the information medium.

20. Analysis device according to claim 19, characterized in that the step (132;140;141) is produced by making a furrow in the thickness of the substance of the screen.

21. Analysis device according to claim 20, characterized in that the furrow (132) exhibits one edge (133) of steep slope and one edge (134) of gentle slope containing the light-transmission zone (120).

22. Analysis device according to claim 21, characterized in that the furrow (132) is produced between the longitudinal edges of the screen.

23. Analysis device according to claim 21, characterized in that the furrow (140) is produced along one longitudinal edge of the screen (119).

24. Analysis device according to claim 20, characterized in that the step (141) is produced by making, in the thickness of the substance of the screen (119), a furrow with edges which are respectively parallel to the sides and to the faces of the screen.

25. Analysis device according to claim 19, characterized in that the step (136) consists of an opaque cover (135) fixed onto that face of the screen (119) which points towards the member (123) for applying the information medium against the said screen, the said cover (135) leaving the light-transmission zone (120) and the zone of contact with the application member (123) uncovered.

\* \* \* \* \*

UNITED STATES PATENT AND TRADEMARK OFFICE
CERTIFICATE OF CORRECTION

PATENT NO. : 5,468,943

DATED : November 21, 1995

INVENTOR(S): Gatto *et al.*

It is certified that an error appears in the above-identified patent and that said Letters Patent is hereby corrected as shown below.

In column 11, at line 24, delete "2" and insert therein --1--.

Signed and Sealed this

Twentieth Day of February, 1996

Attest:

BRUCE LEHMAN

*Attesting Officer*

*Commissioner of Patents and Trademarks*